(12) United States Patent
Na

(10) Patent No.: US 11,157,401 B2
(45) Date of Patent: Oct. 26, 2021

(54) DATA STORAGE DEVICE AND OPERATING METHOD THEREOF PERFORMING A BLOCK SCAN OPERATION FOR CHECKING FOR VALID PAGE COUNTS

(71) Applicant: SK hynix Inc., Gyeonggi-do (KR)

(72) Inventor: Hyeong Ju Na, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/671,899

(22) Filed: Nov. 1, 2019

(65) Prior Publication Data

US 2020/0394134 A1    Dec. 17, 2020

(30) Foreign Application Priority Data

Jun. 13, 2019 (KR) .................. 10-2019-0069800

(51) Int. Cl.
*G06F 12/02* (2006.01)
*G06F 12/0882* (2016.01)
*G06F 3/06* (2006.01)

(52) U.S. Cl.
CPC .......... *G06F 12/0253* (2013.01); *G06F 3/064* (2013.01); *G06F 3/0608* (2013.01); *G06F 3/0652* (2013.01); *G06F 3/0679* (2013.01); *G06F 12/0246* (2013.01); *G06F 12/0882* (2013.01)

(58) Field of Classification Search
CPC ...... G06F 3/0608; G06F 3/064; G06F 3/0652; G06F 3/0679; G06F 12/0246; G06F 12/0253; G06F 12/0882; G06F 2212/7205
USPC ........................................................ 711/154
See application file for complete search history.

(56) References Cited

U.S. PATENT DOCUMENTS 9,830,259 B2   11/2017  Hada
2006/0106972 A1*  5/2006  Gorobets ............ G06F 12/0246
                                                            711/103

(Continued)

FOREIGN PATENT DOCUMENTS

KR    1020160044989    4/2016

OTHER PUBLICATIONS

Han L., Ryu Y., Yim K. (2006) CATA: A Garbage Collection Scheme for Flash Memory File Systems. In: Ma J., Jin H., Yang L.T., Tsai J.JP. (eds) Ubiquitous Intelligence and Computing. UIC 2006. Lecture Notes in Computer Science, vol. 4159. Springer, Berlin, Heidelberg. https://doi.org/10.1007/11833529_11 (Year: 2006).*

(Continued)

*Primary Examiner* — Reginald G Bragdon
*Assistant Examiner* — Aaron D Ho
(74) *Attorney, Agent, or Firm* — IP & T Group LLP

(57) ABSTRACT

A data storage device may include a nonvolatile memory device including a plurality of memory blocks and a controller configured to perform a block scan operation for checking valid page counts of closed blocks, when the number of free blocks among the plurality of memory blocks is equal to or less than a threshold number, select a victim block from the closed blocks among the plurality of memory blocks, and perform a garbage collection operation on the victim block. The controller may change an index of a scan start block among the closed blocks whenever performing the block scan operation.

18 Claims, 8 Drawing Sheets

(56) References Cited

U.S. PATENT DOCUMENTS

| | | | | |
|---|---|---|---|---|
| 2013/0036278 | A1* | 2/2013 | Strzelczak | G06F 3/0608 |
| | | | | 711/161 |
| 2014/0032817 | A1* | 1/2014 | Bux | G06F 12/0261 |
| | | | | 711/103 |
| 2016/0283369 | A1* | 9/2016 | Hada | G06F 12/0246 |
| 2016/0335179 | A1* | 11/2016 | Lee | G06F 3/0652 |
| 2017/0300410 | A1* | 10/2017 | Zhang | G06F 12/0253 |
| 2018/0341557 | A1* | 11/2018 | Koo | G06F 11/1441 |
| 2019/0073295 | A1* | 3/2019 | Lee | G06F 3/0659 |
| 2019/0121727 | A1* | 4/2019 | Kim | G06F 12/0246 |
| 2019/0354473 | A1* | 11/2019 | Bahirat | G06F 3/0631 |

OTHER PUBLICATIONS

Che-Wei Tsao, Yuan-Hao Chang and Ming-Chang Yang, "Performance enhancement of garbage collection for flash storage devices: An efficient victim block selection design," 2013 50th ACM/EDAC/IEEE Design Automation Conference (DAC), Austin, TX, 2013, pp. 1-6. (Year: 2013).*

M. Yang, Y. Chang, C. Tsao, P. Huang, Y. Chang and T. Kuo, "Garbage collection and wear leveling for flash memory: Past and future," 2014 International Conference on Smart Computing, Hong Kong, 2014, pp. 66-73, doi: 10.1109/SMARTCOMP.2014.7043841. (Year: 2014).*

* cited by examiner

FIG.3
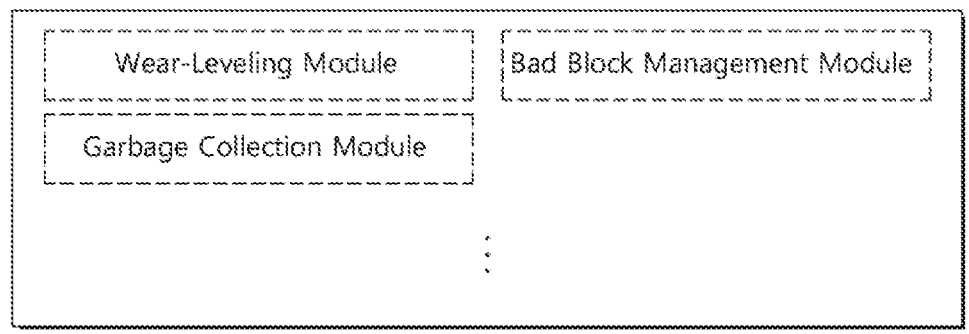
FIG.4
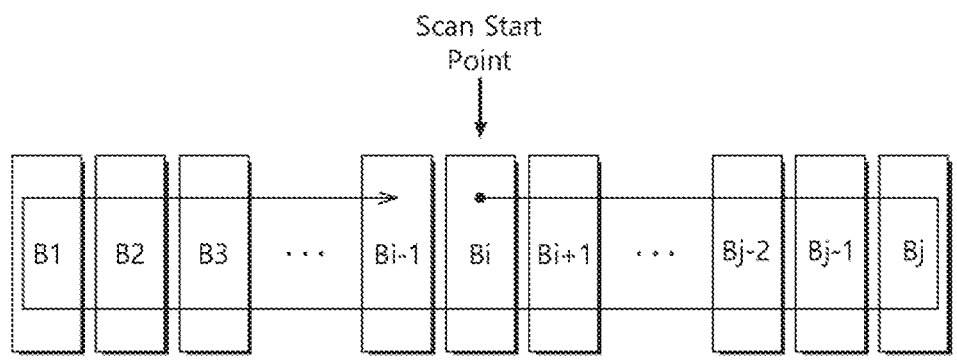
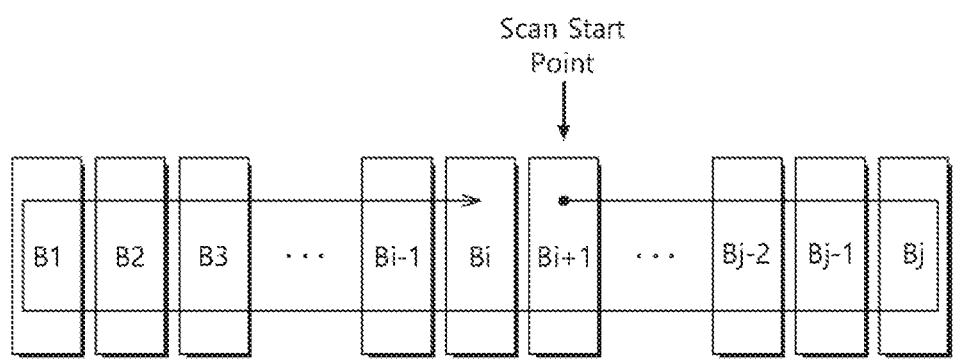

FIG.5
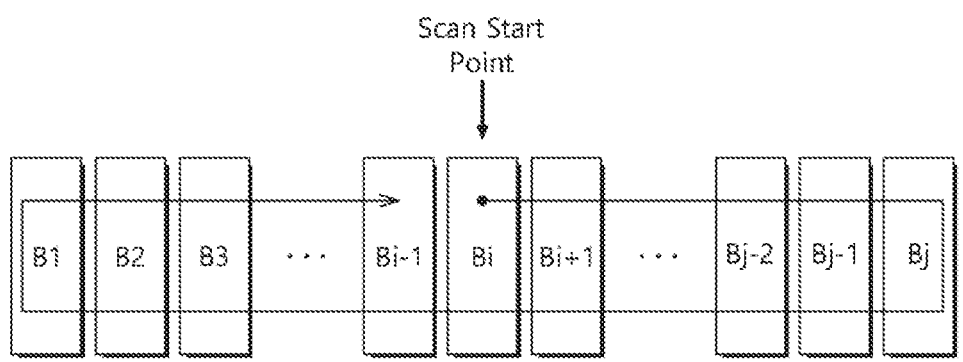
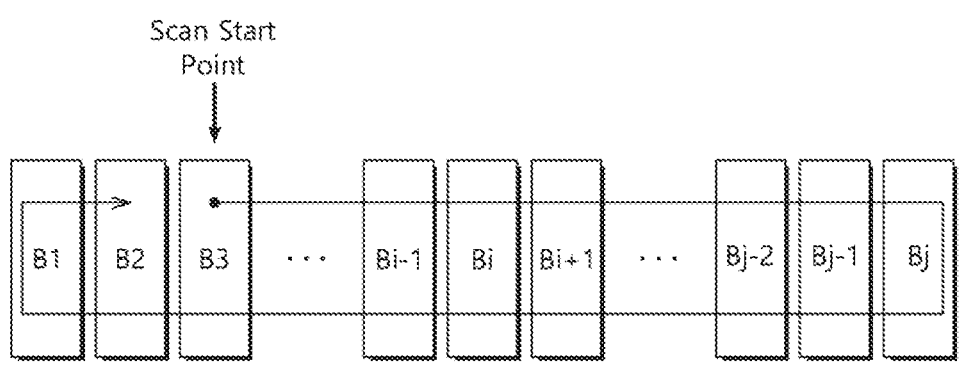

DATA STORAGE DEVICE AND OPERATING METHOD THEREOF PERFORMING A BLOCK SCAN OPERATION FOR CHECKING FOR VALID PAGE COUNTS

CROSS-REFERENCES TO RELATED APPLICATION

This application claims priority under 35 U.S.C. § 119 to Korean application number 10-2019-0069800, filed on Jun. 13, 2019, which is incorporated herein by reference in its entirety.

BACKGROUND

1. Technical Field

Various embodiments relate to an electronic device, and more particularly, to a data storage device and an operating method thereof.

2. Related Art

Recently, a paradigm for the computing environment has changed to a ubiquitous computing environment in which computer systems can be used anytime and anywhere. Therefore, the use of portable electronic devices such as mobile phones, digital cameras and notebook computers has rapidly increased. Such potable electronic devices generally use a data storage device including a memory device. The data storage device is used to store data which are used in the portable electronic devices.

Since a data storage device including a memory device has no mechanical driver, the data storage device has operational stability and durability, high information access speed, and low power consumption. Examples of the data storage device having such advantages may include a universal serial bus (USB) memory device, a memory card having various interfaces, a universal flash storage (UFS) device, and a solid status drive (SSD).

SUMMARY

Various embodiments are directed to a data storage device capable of reducing a difference between program/erase counts of memory blocks, and an operating method thereof.

In an embodiment, a data storage device may include: a nonvolatile memory device including a plurality of memory blocks; and a controller configured to perform a block scan operation for checking valid page counts of closed blocks, when the number of free blocks among the plurality of memory blocks is equal to or less than a threshold number, select a victim block from the closed blocks among the plurality of memory blocks, and perform a garbage collection operation on the victim block. The controller may change an index of a scan start block among the closed blocks whenever performing the block scan operation.

In an embodiment, an operating method of a data storage device may include: determining whether the number of free blocks among the plurality of memory blocks is equal to or less than a threshold number; performing a block scan operation for checking valid page counts of closed blocks, when the number of free blocks is equal to or less than the threshold number; selecting a victim block from the closed blocks among the plurality of memory blocks; and performing a garbage collection operation on the victim block. An index of a scan start block among the closed blocks may be changed whenever the block scan operation is performed.

In an embodiment, a memory system may include: a nonvolatile memory device including a plurality of memory blocks; and a controller configured to perform a garbage collection based on a block scan operation for checking valid page counts regarding closed memory blocks among the plurality of memory blocks, wherein the block scan operation starts at a different closed memory block each time the operation is performed.

BRIEF DESCRIPTION OF THE DRAWINGS

FIG. 3 is a diagram for describing software executed in the data storage device in accordance with an embodiment.

FIGS. 4 and 5 are diagrams illustrating a process for changing an index of a scan start block, in accordance with embodiments.

DETAILED DESCRIPTION

Hereinafter, a data storage device and an operating method thereof according to the present disclosure will be described below with reference to the accompanying drawings through exemplary embodiments.

Figure 1:
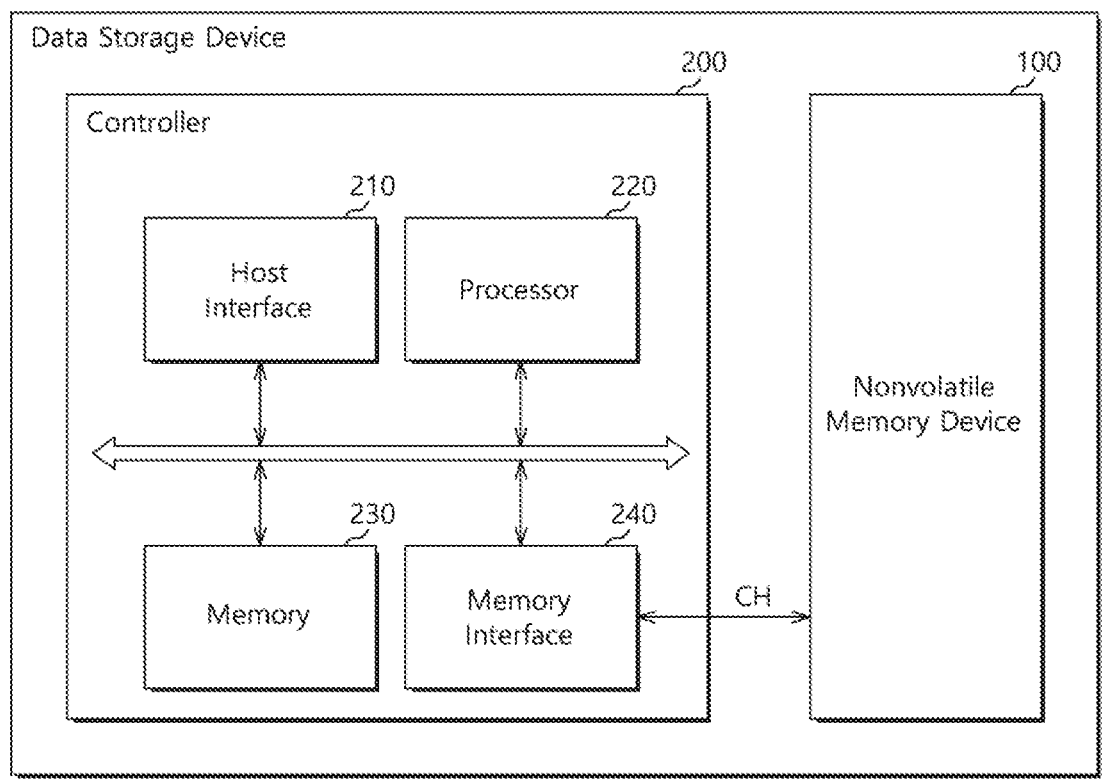
FIG. 1 is a diagram illustrating a data storage device in accordance with an embodiment.

FIG. 1 is a diagram illustrating a data storage device 10 in accordance with an embodiment. In the embodiment, the data storage device 10 may store data accessed by a host (not illustrated) such as a mobile phone, a MP3 player, a laptop computer, a desktop computer, a game machine, a TV, or an in-vehicle infotainment system. The data storage device 10 may be referred to as a memory system.

The data storage device 10 may include at least one of various types of storage devices, depending on a transfer protocol with the host. For example, the data storage device 10 may include any of various types of storage devices which include an SSD (Solid State Drive), an MMC (Multi-Media Card) such as an eMMC, RS-MMC or micro-MMC, an SD (Secure Digital) card such as a mini-SD or a micro-SD, a USB (Universal Serial Bus) storage device, a UFS (Universal Flash Storage) device, a PCMCIA (Personal Computer Memory Card International Association) card-type storage device, a PCI (Peripheral Component Interconnection) card-type storage device, a PCI-e (PCI-express)

card-type storage device, a CF (Compact Flash) card, a smart media card, and a memory stick.

The data storage device 10 may be fabricated as any of various types of packages. For example, the data storage device 10 may be fabricated as any of various types of packages such as a POP (Package-On-Package), a SIP (System-In-Package), a SOC (System-On-Chip), a MCP (Multi-Chip Package), a COB (Chip-On-Board), a WFP (Wafer-Level Fabricated Package), and a WSP (Wafer-Level Stack Package).

Referring to FIG. 1, the data storage device 10 may include a nonvolatile memory device 100 and a controller 200.

The nonvolatile memory device 100 may operate as a storage medium of the data storage device 10. The nonvolatile memory device 100 may be configured as any of various types of nonvolatile memory devices such as a NAND flash memory device, a NOR flash memory device, a ferroelectric random access memory (FRAM) using ferroelectric capacitors, a magnetic random access memory (MRAM) using a tunneling magneto-resistive (TMR) layer, a phase change random access memory (PRAM) using chalcogenide alloys, and a resistive random access memory (ReRAM) using transition metal oxide.

The nonvolatile memory device 100 may include a memory cell array having a plurality of memory cells arranged at the respective intersections between a plurality of bit lines (not illustrated) and a plurality of word lines (not illustrated). Each memory cell of the memory cell array may be configured as one of a single level cell (SLC) for storing 1-bit data therein, a multi-level cell (MLC) for storing 2-bit data therein, a triple level cell (TLC) for storing 3-bit data therein, and a quadruple level cell (QLC) for storing 4-bit data therein. The memory cell array may include one or more of the SLC, the MLC, the TLC, and the QLC. Furthermore, the memory cell array may include memory cells with a two-dimensional horizontal structure or memory cells with a three-dimensional vertical structure.

The controller 200 may include a host interface 210, a processor 220, a memory 230, and a memory interface 240.

The host interface 210 may interface the host and the data storage device 10. For example, the host interface 210 may communicate with the host through any of standard transfer protocols such as USB (Universal Serial Bus), UFS (Universal Flash Storage), MMC (Multimedia Card), PATA (Parallel Advanced Technology Attachment), SATA (Serial Advanced Technology Attachment), SCSI (Small Computer System Interface), SAS (Serial Attached SCSI), PCI (Peripheral Component Interconnection) and PCI-e (PCI express).

The processor 220 may include a micro control unit (MCU) and a central processing unit (CPU). The processor 220 may process a request transferred from the host. In order to process the request received from the host device, the processor 220 may drive a code-based instruction or algorithm loaded to the memory 230, i.e. software, and control the internal function blocks and the nonvolatile memory device 100.

The memory 230 may include a RAM such as a dynamic RAM (DRAM) or static RAM (SRAM). The memory 230 may store software or firmware driven by the processor 220. Furthermore, the memory 230 may store data required for driving the software, for example, metadata. That is, the memory 230 may operate as a working memory of the processor 220.

The memory 230 may temporarily store data to be transferred to the nonvolatile memory device 100 from the host or data to be transferred to the host from the nonvolatile memory device 100. That is, the memory 230 may operate as a data buffer.

The memory interface 240 may control the nonvolatile memory device 100 under control of the processor 220. The memory interface 240 may be referred to as a memory controller or an FTC (Flash Control Top). The memory interface 240 may provide control signals to the nonvolatile memory device 100. The control signals may include a command, an address and the like for controlling the nonvolatile memory device 100. The memory interface 240 may provide data to the nonvolatile memory device 100, or receive data from the nonvolatile memory device 100. The memory interface 240 may be coupled to the nonvolatile memory device 100 through a channel CH including one or more signal lines.

Figure 2:
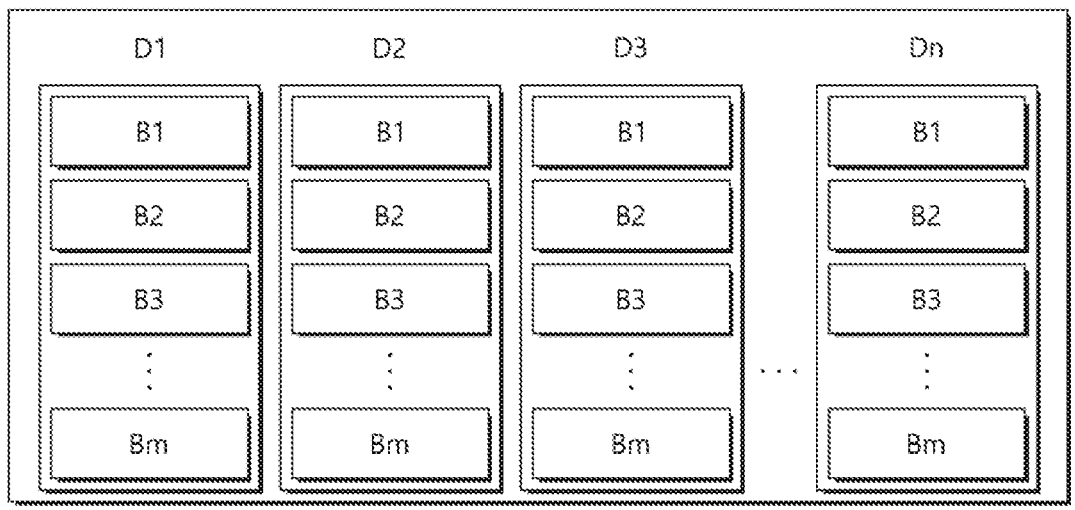
FIG. 2 is a diagram illustrating a configuration of a nonvolatile memory device of FIG. 1.

FIG. 2 is a diagram illustrating a configuration example of the nonvolatile memory device 100.

Referring to FIG. 2, the nonvolatile memory device 100 may include a plurality of dies D1 to Dn. Each of the plurality of dies D1 to Dn may include a plurality of memory blocks B1 to Bm. Although not illustrated in FIG. 2, each of the plurality of dies D1 to Dn may include a plurality of planes, and each of the plurality of planes may include a plurality of memory blocks. For convenience of description, FIG. 2 illustrates that each of the plurality of dies D1 to Dn does not include the plurality of planes.

Although not illustrated in FIG. 2, some memory blocks in the respective dies D1 to Dn may be grouped as one group. For example, first to $m^{th}$ memory blocks B1 to Bm individually included in the plurality of dies D1 to Dn may be respectively grouped as memory block groups. The first memory blocks B1 of each of the dies D1, . . . , Dn may be grouped as a first memory block group. Thus, the nonvolatile memory device 100 may include m memory block groups. The memory block group may be referred to as a super block.

FIG. 3 is a diagram illustrating software which is stored in the memory 230 and executed by the processor 220.

When the nonvolatile memory device 100 is configured as a flash memory device, the processor 220 may control operations of the nonvolatile memory device 100, and execute software referred to as an FTL (Flash Translation layer), to provide device compatibility to the host. As the FTL is executed, the host may recognize and use the data storage device 10 as a general storage such as a hard disk. The FTL loaded to the memory 230 may include modules for performing various functions and handling meta data required for executing the modules.

Referring to FIG. 3, the FTL may include a wear-leveling module WLM, a bad block management module BBM, a garbage collection module GCM, and the like. However, the configuration of the FTL is not limited to the above-described modules, and the FTL may further include a read module, a program (or write) module, a power management module, an address map, and the like.

The wear-leveling module WLM may manage the wear levels of the memory blocks in the nonvolatile memory device 100. The memory cells of the nonvolatile memory device 100 may be worn out by repeated erase and program operations. The worn memory cells may cause a defect (for example, a physical defect which causes a memory cell to not stably store a piece of data nor output a piece of data stored therein). To prevent a specific memory block from being worn out faster than the other memory blocks, the wear-leveling module WLM may manage the memory blocks to reduce a deviation between program-erase counts of the memory blocks. That is, the wear-leveling module WLM may control the wear levels of all the memory blocks included in the nonvolatile memory device 100 such that the memory blocks have substantially similar wear levels.

The bad block management module BBM may manage a memory block in which a defect occurred, among the memory blocks of the nonvolatile memory device 100. As described above, a defect (for example, a physical defect) may occur in a worn memory cell. Data stored in the memory cell in which the defect occurred cannot be normally read. Furthermore, data may not be normally programmed to the memory cell in which the defect occurred. The bad block management module BBM may manage a memory block including the memory cell in which the defect occurred, such that the memory block will not be used. That is, the bad block management module BBM may register a memory block in which a read fail/program fail occurred repeatedly, into a bad block list, such that the bad blocks are no longer used.

The garbage collection module GCM may manage the nonvolatile memory device 100 to perform an operation of collecting valid data stored in plural memory blocks of the nonvolatile memory device 100, copying collected valid data into another memory block, updating an address map of copied valid data, and erasing the plural memory blocks including only invalid data.

The nonvolatile memory device 100 configured as a flash memory device does not support a data overwrite function due to its structural characteristics. When a piece of data is programmed to a memory cell previously programmed but not erased, the reliability of data stored in the corresponding memory cell may not be guaranteed. In order to program a piece of data to the memory cell previously programmed, an erase operation on the corresponding memory cell may be required.

Since the erase operation on the nonvolatile memory device 100 is performed on a memory block basis, it takes a considerably long time to perform the erase operation. Thus, when a memory cell corresponding to an address to be newly programmed with data and the memory cell has already been programmed, the processor 220 may program the data to another memory cell which is erased, instead of programming the data to the memory cell corresponding to the address after erasing the memory cell. In this case, data stored in the memory cell previously programmed becomes invalid as previous data, and data stored in another memory cell becomes valid as the latest data. Due to such an operation of the processor 220, valid data and invalid data may be together in a single memory block.

The processor 220 may execute the garbage collection module GCM when the number of available blocks (i.e. free blocks) among the memory blocks of the nonvolatile memory device 100 is equal to or less than a threshold number. The garbage collection module GCM may check valid page counts of completely used blocks (i.e. closed blocks) among the memory blocks of the nonvolatile memory device 100, and select a victim memory block (hereafter, referred to as a 'victim block'). For example, the garbage collection module GCM may select, as a victim block, a closed block having the minimum valid page count among the closed blocks of the nonvolatile memory device 100. However, the condition to select the victim block is not specifically limited thereto. In the embodiment, the free block may indicate a memory block which can be used for programming a new piece of data. For example, the free block may indicate a block including only invalid pages having invalid data stored therein, a block including only pages which are not programmed, or a block including only erased pages. The closed block may indicate a block including no pages which are not programmed, because data are stored in all of the pages.

The garbage collection module GCM may control the nonvolatile memory device 100 to perform an operation of moving valid data included in the victim block to another memory block (for example, a free block). Therefore, all of the data in the victim block would be invalid, so the garbage collection module GCM may control the nonvolatile memory device 100 to perform an operation of erasing the victim block.

As described above, the garbage collection module GCM may check the valid page counts of the respective closed blocks, to select the victim block. For example, the garbage collection module GCM may check the valid page count regarding each of the closed blocks by performing a block scan operation of checking the number of valid pages written in the corresponding closed block. However, the embodiment is not limited thereto.

The garbage collection module GCM may perform the block scan operation on each of the closed blocks in a forward direction or a backward direction from a scan start block. In the embodiment, the garbage collection module GCM may change an index of the scan start block whenever performing a garbage collection operation. That is, the garbage collection module GCM may change a start position of the block scan operation whenever performing the block scan operation for selecting a victim block on which the garbage collection operation is to be performed.

During the garbage collection operation, the closed block having the minimum valid page count may be generally selected as the victim block. In some cases, however, the numbers of valid pages included in two or more closed blocks may be equal.

For example, when sequential write requests are received from the host and sequential write operations are repeatedly performed in the nonvolatile memory device 100, the numbers of valid pages included in two or more closed blocks may be equal. For another example, even when full sequential write requests for the entire logical block addresses (LBAs) are continuously received from the host, the numbers of valid pages included in all of the closed blocks may be the same.

In this case, the garbage collection module GCM may select, as the victim block, a scan start block in which the block scan operation is started or a scan end block in which the block scan operation is ended, when all of the closed blocks has the same valid page count. When the index of the scan start block is fixed, the victim block selected in the previous garbage collection operation is highly likely to be selected as the victim block even in the current garbage collection operation. As such, when a specific memory block is repeatedly selected as the victim block, the program-erase count of the corresponding memory block is significantly increased. Thus, a deviation or a difference in program-erase counts from other memory blocks is also increased. As a result, an unnecessary wear-leveling operation may be caused.

In the embodiment, in order to solve such a problem, the index of the scan start block is changed whenever the garbage collection operation is performed. Thus, although the valid page counts of the closed blocks are equal, the victim block selected in the previous garbage collection operation can be prevented from being re-selected as the victim block in the current garbage collection operation.

FIGS. 4 and 5 are diagrams illustrating a process of changing the index of a scan start block in accordance with embodiments. For convenience of description, the first to $j^{th}$ blocks B1 to Bj illustrated in FIGS. 4 and 5 are closed blocks included in the nonvolatile memory device 100. Furthermore, in FIGS. 4 and 5, '$1^{st}$ GC' represents the previous (or immediately previous) garbage collection operation, and '$2^{nd}$ GC' represents the current garbage collection operation.

As illustrated in FIGS. 4 and 5, the garbage collection module GCM may change the index of the scan start block according to various conditions.

In an embodiment, referring to FIG. 4, the garbage collection module GCM may select the index i+1 of a closed block Bi+1, which is the next closed block of a scan start block Bi in the previous garbage collection operation $1^{st}$ GC, as the index of the scan start block in the current garbage collection operation $2^{nd}$ GC.

In another embodiment, the garbage collection module GCM may change the index of the scan start block according to one of the program-erase count and the latest erase time for each of the closed blocks B1 to Bj. For example, the garbage collection module GCM may select the index '3' of the closed block (for example, 'B3') having the minimum program-erase count among the closed blocks B1 to Bj as the index of the scan start block in the current garbage collection operation $2^{nd}$ GC. Alternatively, the garbage collection module GCM may select the index '3' of the closed block (for example, 'B3'), whose latest erase time is the earliest among the closed blocks B1 to Bj, as the index of the scan start block in the current garbage collection operation $2^{nd}$ GC.

In another embodiment, the garbage collection module GCM may completely randomly change the index of the scan start block without any rules.

Figure 6:
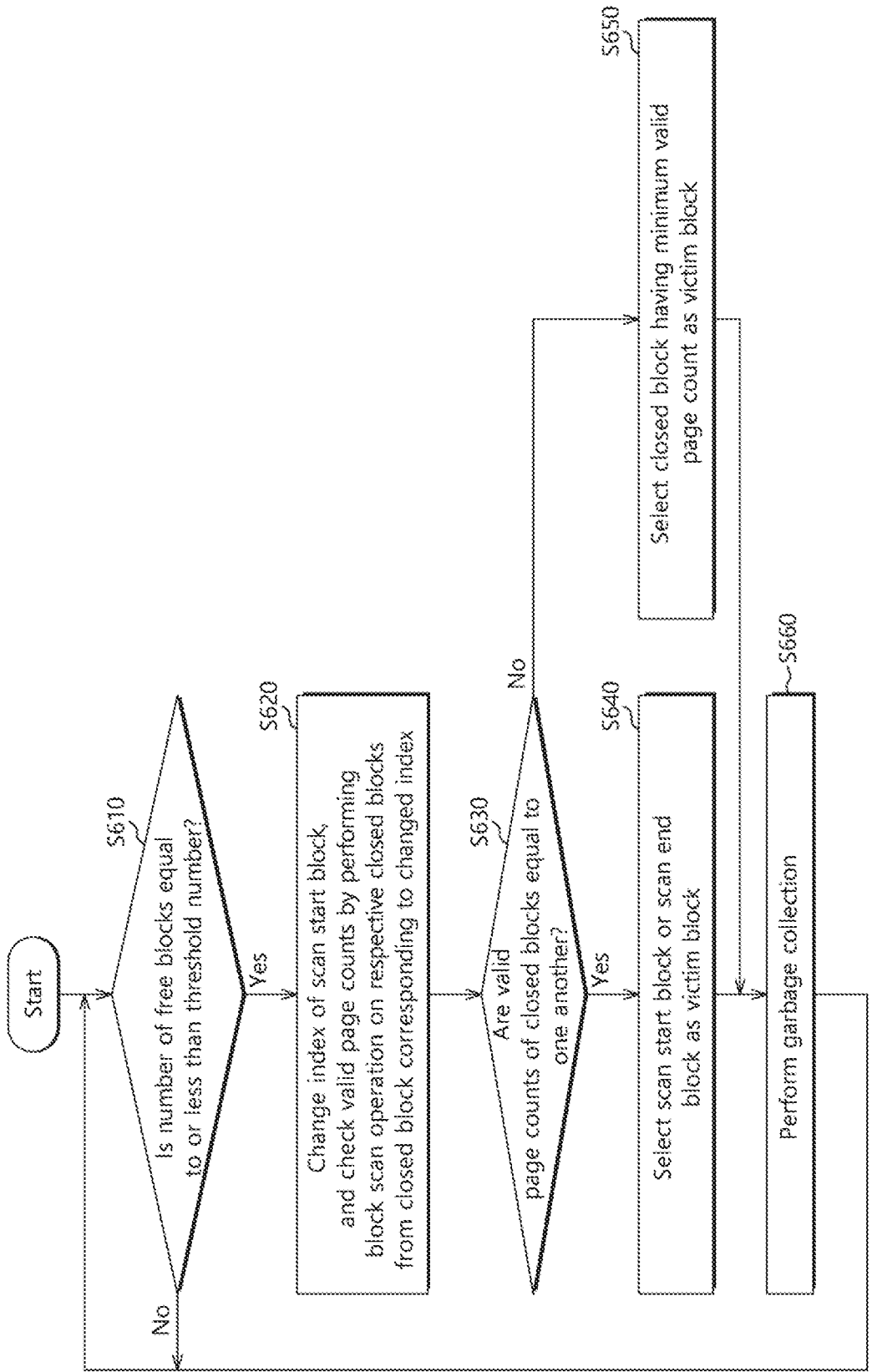
FIG. 6 is a flowchart illustrating an operating method of a data storage device in accordance with an embodiment.

FIG. 6 is a flowchart illustrating an operating method of a data storage device in accordance with an embodiment. While the operating method of the data storage device in accordance with the present embodiment is described with reference to FIG. 6, references will be made to FIGS. 1 to 5.

In step S610, the controller 200 may determine whether the number of free blocks among the plurality of memory blocks included in the nonvolatile memory device 100 is equal to or less than the threshold number. When the number of free blocks is less than the threshold number, the process may proceed to step S620. When the number of free blocks exceeds the threshold number, the process may repeat step S610.

In step S620, the controller 200 may perform block scan operations on the respective closed blocks included in the nonvolatile memory device 100, in order to check the valid page counts of the closed blocks. At this time, the controller 200 may change the index of the scan start block where the block scan operation is to be started, and sequentially perform the block scan operations on the respective closed blocks from the closed block corresponding to the changed index. Since the process of changing the index of the scan start block has been described in detail in the above embodiment, the descriptions will be omitted herein.

In step S630, the controller 200 may determine whether the valid page counts of the respective closed blocks are equal. When the valid page counts of the respective closed blocks are equal, the process may proceed to step S640. When the valid page counts of the respective closed blocks are not equal, the process may proceed to step S650.

In step S640, the controller 200 may select, as a victim block, the closed block corresponding to the index changed in step S620, i.e. the scan start block. For another example, the controller 200 may select, as the victim block, a scan end block where the last block scan operation is performed, among the closed blocks. Accordingly, repeatedly selecting the same memory block as the victim block can be avoided.

In step S650, the controller 200 may select, as the victim block, the closed block having the minimum valid page count among the closed blocks.

In step S660, the controller 200 may control the nonvolatile memory device 100 to perform a garbage collection operation on the victim block selected in steps S640, and S650. When the garbage collection operation is completed, the process may return to step S610.

A program erase count difference or deviation between memory blocks may occur when the same memory block is sequentially selected as the victim block. In accordance with the embodiments, the scan start block, i.e., the memory block where the block scan operation for checking the valid page counts of the respective memory blocks is started, may be changed whenever the victim block for garbage collection is selected. Thus, it is possible to prevent an increase in the program erase count difference or deviation between memory blocks.

Figure 7:
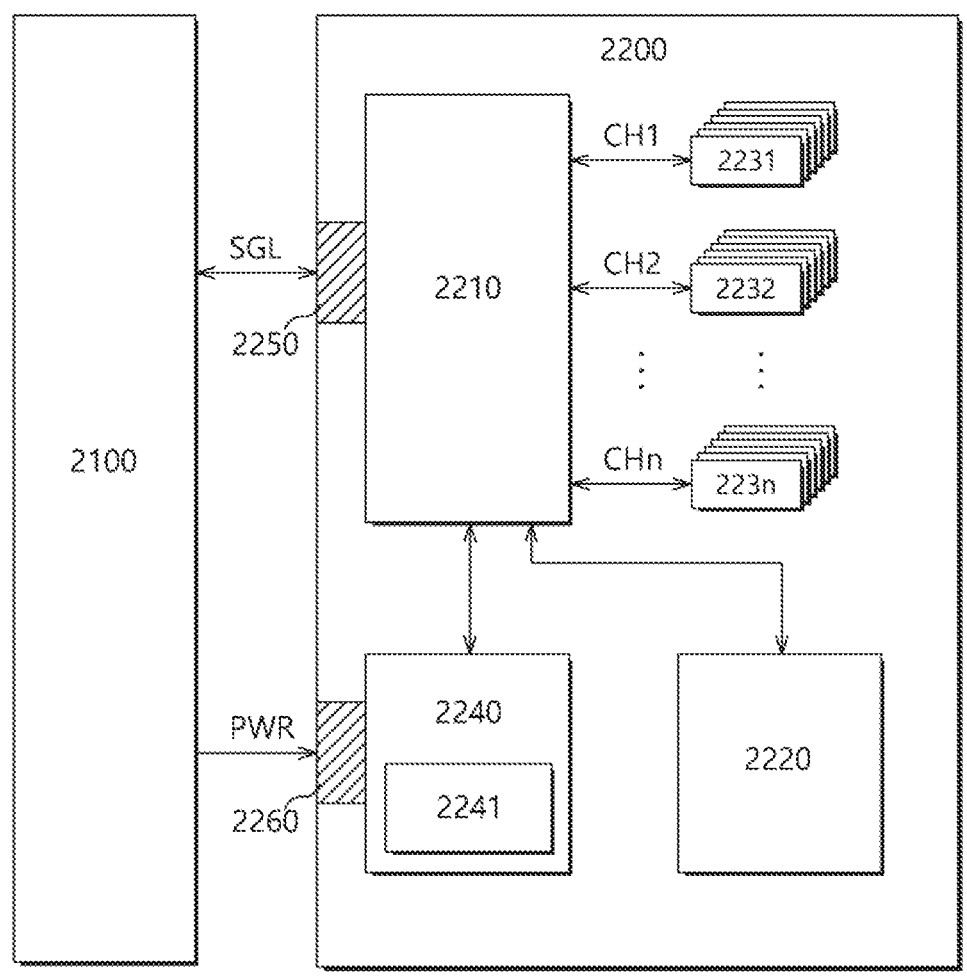
FIG. 7 is a diagram illustrating a data processing system including a solid state drive (SSD) in accordance with an embodiment.

FIG. 7 illustrates a data processing system including a solid state drive (SSD) in accordance with an embodiment. Referring to FIG. 7, a data processing system 2000 may include a host apparatus 2100 and an SSD 2200.

The SSD 2200 may include a controller 2210, a buffer memory device 2220, nonvolatile memory devices 2231 to 223n, a power supply 2240, a signal connector 2250, and a power connector 2260.

The controller 2210 may control an overall operation of the SSD 2220.

The buffer memory device 2220 may temporarily store data to be stored in the nonvolatile memory devices 2231 to 223n. The buffer memory device 2220 may temporarily store data read from the nonvolatile memory devices 2231 to 223n. The data temporarily stored in the buffer memory device 2220 may be transmitted to the host apparatus 2100 or the nonvolatile memory devices 2231 to 223n according to control of the controller 2210.

The nonvolatile memory devices 2231 to 223n may be used as a storage medium of the SSD 2200. The nonvolatile memory devices 2231 to 223n may be coupled to the controller 2210 through a plurality of channels CH1 to CHn. One or more nonvolatile memory devices may be coupled to one channel. The nonvolatile memory devices coupled to the one channel may be coupled to the same signal bus and the same data bus.

The power supply 2240 may provide power PWR input through the power connector 2260 to the inside of the SSD 2200. The power supply 2240 may include an auxiliary power supply 2241. The auxiliary power supply 2241 may supply the power so that the SSD 2200 is normally terminated even when sudden power-off occurs. The auxiliary power supply 2241 may include large capacity capacitors capable of charging the power PWR.

The controller 2210 may exchange a signal SGL with the host apparatus 2100 through the signal connector 2250. The signal SGL may include a command, an address, data, and the like. The signal connector 2250 may be configured as various types of connectors according to an interfacing method between the host apparatus 2100 and the SSD 2200.

Figure 8:
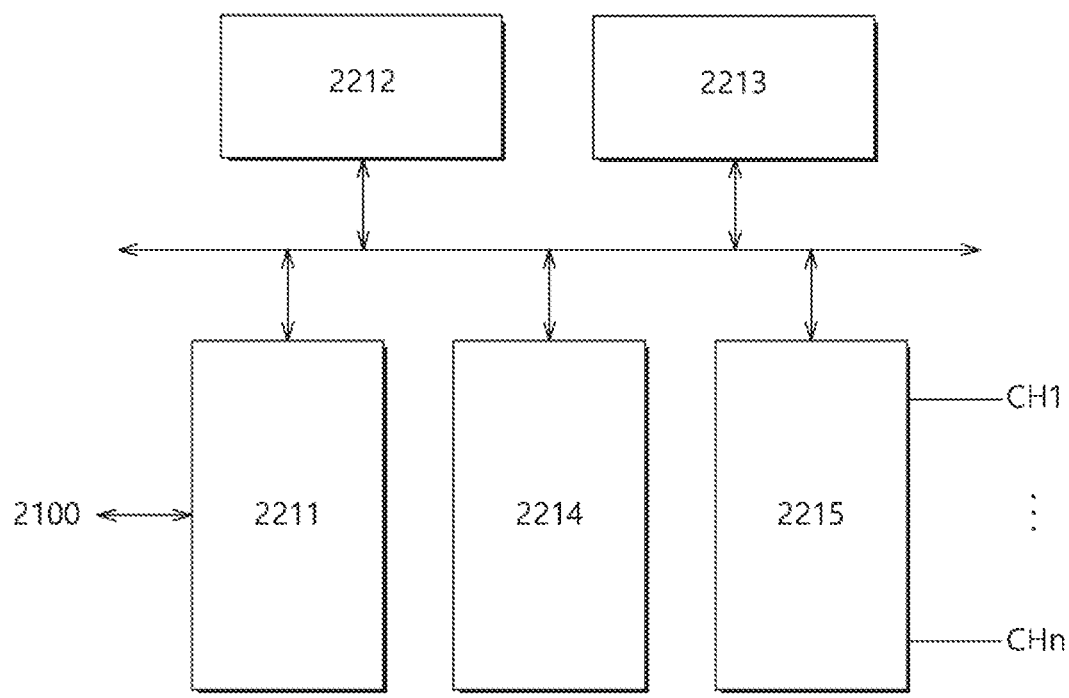
FIG. 8 is a diagram illustrating a controller illustrated in FIG. 7.

FIG. 8 illustrates the controller 2210 of FIG. 7. Referring to FIG. 8, the controller 2210 may include a host interface unit 2211, a control unit 2212, a random access memory (RAM) 2213, an error correction code (ECC) unit 2214, and a memory interface unit 2215.

The host interface unit 2211 may perform interfacing between the host apparatus 2100 and the SSD 2200 according to a protocol of the host apparatus 2100. For example, the host interface unit 2211 may communicate with the host apparatus 2100 through any one of a secure digital protocol, a universal serial bus (USB) protocol, a multimedia card (MMC) protocol, an embedded MMC (eMMC) protocol, a personal computer memory card international association (PCMCIA) protocol, a parallel advanced technology attachment (PATA) protocol, a serial advanced technology attachment (SATA) protocol, a small computer system interface (SCSI) protocol, a serial attached SCSI (SAS) protocol, a peripheral component interconnection (PCI) protocol, a PCI Express (PCI-E) protocol, and a universal flash storage (UFS) protocol. The host interface unit 2211 may perform a disc emulation function so that the host apparatus 2100 recognizes the SSD 2200 as a general-purpose data storage apparatus, for example, a hard disc drive HDD.

The control unit 2212 may analyze and process the signal SGL input from the host apparatus 2100. The control unit 2212 may control operations of internal functional blocks according to firmware and/or software for driving the SDD 2200. The RAM 2213 may be operated as a working memory for driving the firmware or software.

The ECC unit 2214 may generate parity data for the data to be transferred to the nonvolatile memory devices 2231 to 223n. The generated parity data may be stored in the nonvolatile memory devices 2231 to 223n together with the data. The ECC unit 2214 may detect errors for data read from the nonvolatile memory devices 2231 to 223n based on the parity data. When detected errors are within a correctable range, the ECC unit 2214 may correct the detected errors.

The memory interface unit 2215 may provide a control signal such as a command and an address to the nonvolatile memory devices 2231 to 223n according to control of the control unit 2212. The memory interface unit 2215 may exchange data with the nonvolatile memory devices 2231 to 223n according to control of the control unit 2212. For example, the memory interface unit 2215 may provide data stored in the buffer memory device 2220 to the nonvolatile memory devices 2231 to 223n or provide data read from the nonvolatile memory devices 2231 to 223n to the buffer memory device 2220.

Figure 9:
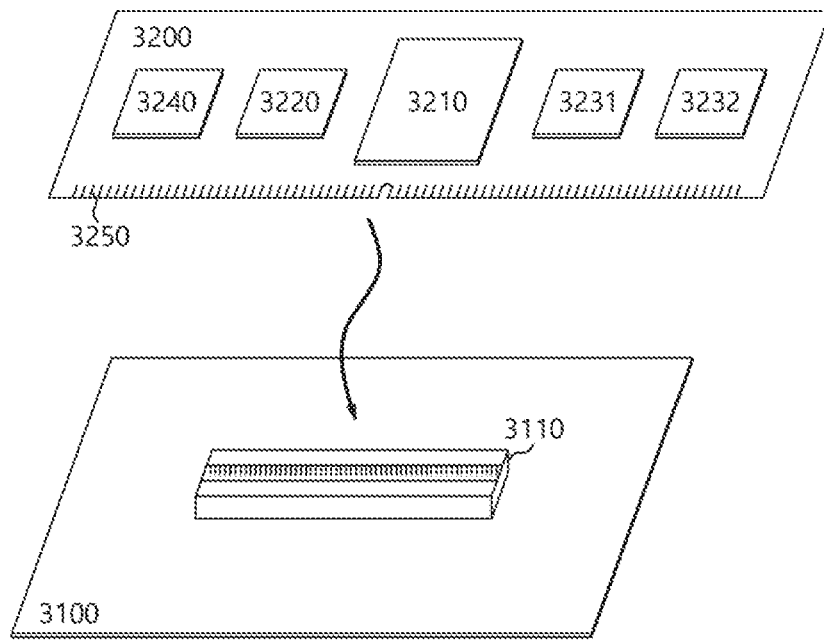
FIG. 9 is a diagram illustrating a data processing system including a data storage apparatus in accordance with an embodiment.

FIG. 9 illustrates a data processing system including a data storage apparatus in accordance with an embodiment. Referring to FIG. 9, a data processing system 3000 may include a host apparatus 3100 and a data storage apparatus 3200.

The host apparatus 3100 may be configured in a board form such as a printed circuit board (PCB). Although not shown in FIG. 9, the host apparatus 3100 may include internal functional blocks configured to perform functions of the host apparatus 3100.

The host apparatus 3100 may include a connection terminal 3110 such as a socket, a slot, or a connector. The data storage apparatus 3200 may be mounted on the connection terminal 3110.

The data storage apparatus 3200 may be configured in a board form such as a PCB. The data storage apparatus 3200 may refer to a memory module or a memory card. The data storage apparatus 3200 may include a controller 3210, a buffer memory device 3220, nonvolatile memory devices 3231 to 3232, a power management integrated circuit (PMIC) 3240, and a connection terminal 3250.

The controller 3210 may control an overall operation of the data storage apparatus 3200. The controller 3210 may be configured to have the same configuration as the controller 2210 illustrated in FIG. 8.

The buffer memory device 3220 may temporarily store data to be stored in the nonvolatile memory devices 3231, and 3232. The buffer memory device 3220 may temporarily store data read from the nonvolatile memory devices 3231, and 3232. The data temporarily stored in the buffer memory device 3220 may be transmitted to the host apparatus 3100 or the nonvolatile memory devices 3231, and 3232 according to control of the controller 3210.

The nonvolatile memory devices 3231, and 3232 may be used as a storage medium of the data storage apparatus 3200.

The PMIC 3240 may provide power input through the connection terminal 3250 to the inside of the data storage apparatus 3200. The PMIC 3240 may manage the power of the data storage apparatus 3200 according to control of the controller 3210.

The connection terminal 3250 may be coupled to the connection terminal 3110 of the host apparatus 3100. A signal such as a command, an address, and data, and power may be transmitted between the host apparatus 3100 and the data storage apparatus 3200 through the connection terminal 3250. The connection terminal 3250 may be configured in various forms according to an interfacing method between the host apparatus 3100 and the data storage apparatus 3200. The connection terminal 3250 may be arranged in any side of the data storage apparatus 3200.

Figure 10:
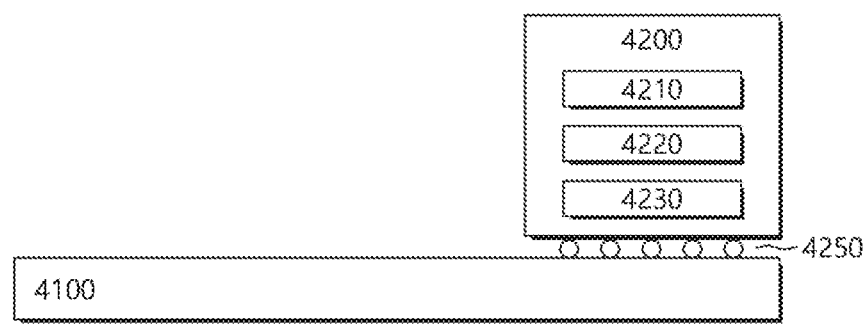
FIG. 10 is a diagram illustrating a data processing system including a data storage apparatus in accordance with an embodiment.

FIG. 10 illustrates a data processing system including a data storage apparatus in accordance with an embodiment. Referring to FIG. 10, a data processing system 4000 may include a host apparatus 4100 and a data storage apparatus 4200.

The host apparatus 4100 may be configured in a board form such as a printed circuit board (PCB). Although not shown in FIG. 10, the host apparatus 4100 may include internal functional blocks configured to perform functions of the host apparatus 4100.

The data storage apparatus 4200 may be configured in a surface mounting packaging form. The data storage apparatus 4200 may be mounted on the host apparatus 4100 through a solder ball 4250. The data storage apparatus 4200 may include a controller 4210, a buffer memory device 4220, and a nonvolatile memory device 4230.

The controller 4210 may control an overall operation of the data storage apparatus 4200. The controller 4210 may be configured to have the same configuration as the controller 2210 illustrated in FIG. 8.

The buffer memory device 4220 may temporarily store data to be stored in the nonvolatile memory device 4230. The buffer memory device 4220 may temporarily store data read from the nonvolatile memory device 4230. The data temporarily stored in the buffer memory device 4220 may be transmitted to the host apparatus 4100 or the nonvolatile memory device 4230 through control of the controller 4210.

The nonvolatile memory device 4230 may be used as a storage medium of the data storage apparatus 4200.

Figure 11:
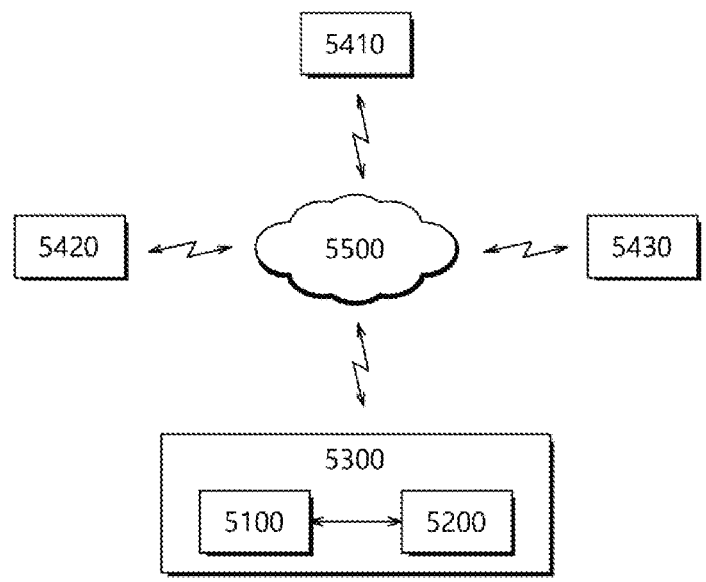
FIG. 11 is a diagram illustrating a network system including a data storage apparatus in accordance with an embodiment.

FIG. 11 illustrates a network system 5000 including a data storage apparatus in accordance with an embodiment. Referring to FIG. 11, the network system 5000 may include a server system 5300 and a plurality of client systems 5410 to 5430 which are coupled through a network 5500.

The server system 5300 may serve data in response to requests of the plurality of client systems 5410 to 5430. For example, the server system 5300 may store data provided from the plurality of client systems 5410 to 5430. In another example, the server system 5300 may provide data to the plurality of client systems 5410 to 5430.

The server system 5300 may include a host apparatus 5100 and a data storage apparatus 5200. The data storage apparatus 5200 may be configured of the data storage device 10 of FIG. 1, the SSD 2200 of FIG. 7, the data storage apparatus 3200 of FIG. 9, or the data storage apparatus 4200 of FIG. 10.

Figure 12:
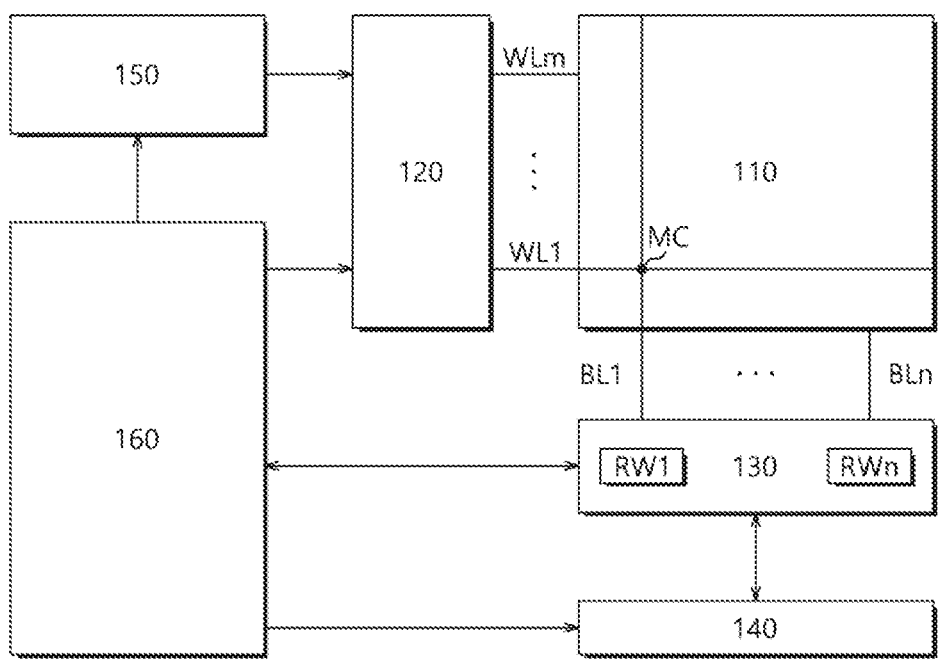
FIG. 12 is a diagram illustrating a nonvolatile memory device included in a data storage apparatus in accordance with an embodiment.

FIG. 12 illustrates a nonvolatile memory device included in a data storage apparatus in accordance with an embodiment. Referring to FIG. 12, a nonvolatile memory device 100 may include a memory cell array 110, a row decoder 120, a column decoder 140, a data read/write block 130, a voltage generator 150, and a control logic 160.

The memory cell array 110 may include memory cells MC arranged in regions in which word lines WL1 to WLm and bit lines BL1 to BLn cross to each other.

The row decoder 120 may be coupled to the memory cell array 110 through the word lines WL1 to WLm. The row decoder 120 may operate through control of the control logic 160. The row decoder 120 may decode an address provided from an external apparatus (not shown). The row decoder 120 may select and drive the word lines WL1 to WLm based on a decoding result. For example, the row decoder 120 may provide a word line voltage provided from the voltage generator 150 to the word lines WL1 to WLm.

The data read/write block 130 may be coupled to the memory cell array 110 through the bit lines BL1 to BLn. The data read/write block 130 may include read/write circuits RW1 to RWn corresponding to the bit lines BL1 to BLn. The data read/write block 130 may operate according to control of the control logic 160. The data read/write block 130 may operate as a write driver or a sense amplifier according to an operation mode. For example, the data read/write block 130 may operate as the write driver configured to store data provided from an external apparatus in the memory cell array 110 in a write operation. In another example, the data read/write block 130 may operate as the sense amplifier configured to read data from the memory cell array 110 in a read operation.

The column decoder 140 may operate through control of the control logic 160. The column decoder 140 may decode an address provided from an external apparatus (not shown). The column decoder 140 may couple the read/write circuits RW1 to RWn of the data read/write block 130 corresponding to the bit lines BL1 to BLn and data input/output (I/O) lines (or data I/O buffers) based on a decoding result.

The voltage generator 150 may generate voltages used for an internal operation of the nonvolatile memory device 100. The voltages generated through the voltage generator 150 may be applied to the memory cells of the memory cell array 110. For example, a program voltage generated in a program operation may be applied to word lines of memory cells in which the program operation is to be performed. In another example, an erase voltage generated in an erase operation may be applied to well regions of memory cells in which the erase operation is to be performed. In another example, a read voltage generated in a read operation may be applied to word lines of memory cells in which the read operation is to be performed.

The control logic 160 may control an overall operation of the nonvolatile memory device 100 based on a control signal provided from an external apparatus. For example, the control logic 160 may control an operation of the nonvolatile memory device 100 such as a read operation, a write operation, and an erase operation of the nonvolatile memory device 100.

While various embodiments have been described above, it will be understood to those skilled in the art that the embodiments described are examples only. Accordingly, the data storage device and the operating method thereof, which have been described herein, should not be limited based on the described embodiments.

What is claimed is:

1. A data storage device comprising:
    a nonvolatile memory device including a plurality of memory blocks; and
    a controller configured to perform a block scan operation for checking valid page counts of closed blocks, when a number of free blocks among the plurality of memory blocks is equal to or less than a threshold number, select a victim block from the closed blocks among the plurality of memory blocks, and perform a garbage collection operation on the victim block,
    wherein the controller changes an index of a scan start block among the closed blocks whenever performing the block scan operation, and
    wherein the controller non-sequentially changes the index of the scan start block according to a predetermined condition.

2. The data storage device of claim 1, wherein when the valid page counts of the closed blocks are equal, the controller selects the scan start block as the victim block.

3. The data storage device of claim 1, wherein when the valid page counts of the closed blocks are equal, the controller selects, as the victim block, a scan end block where the block scan operation is performed for the last time, among the closed blocks.

4. The data storage device of claim 1, wherein when the valid page counts of the closed blocks are not equal, the controller selects, as the victim block, the closed block having a minimum valid page count among the closed blocks.

5. The data storage device of claim 1, wherein the controller changes the index of the scan start block according to program-erase counts of the respective closed blocks.

6. The data storage device of claim 5, wherein the controller selects the index of the closed block having a minimum program-erase count among the closed blocks as the index of the scan start block.

7. The data storage device of claim 1, wherein the controller changes the index of the scan start block according to the latest erase times of the respective closed blocks.

8. The data storage device of claim 7, wherein the controller selects the index of the closed block whose latest erase time is earliest, among the closed blocks, as the index of the scan start block.

9. An operating method of a data storage device which includes a controller and a nonvolatile memory device having a plurality of memory blocks, the operating method comprising the steps of:
    determining whether a number of free blocks among the plurality of memory blocks is equal to or less than a threshold number;
    performing a block scan operation for checking valid page counts of closed blocks, when the number of free blocks is equal to or less than the threshold number;
    selecting a victim block from the closed blocks among the plurality of memory blocks; and
    performing a garbage collection operation on the victim block,
    wherein an index of a scan start block among the closed blocks is changed whenever the block scan operation is performed, and wherein the index of the scan start block is changed non-sequentially according to a predetermined condition.

10. The operating method of claim 9, wherein the step of selecting the victim block comprises the step of selecting the scan start block as the victim block, when the valid page counts of the closed blocks are equal.

11. The operating method of claim 9, wherein the step of selecting the victim block comprises the step of selecting, as the victim block, a scan end block where the block scan operation is performed for the last time, among the closed blocks, when the valid page counts of the closed blocks are equal.

12. The operating method of claim 9, wherein the step of selecting the victim block comprises the step of selecting, as the victim block, the closed block having a minimum valid page count among the closed blocks, when the valid page counts of the closed blocks are not equal.

13. The operating method of claim 9, wherein the index of the scan start block is changed according to the program-erase counts of the respective closed blocks.

14. The operating method of claim 13, wherein the index of the scan start block is changed to the index of the closed block having a minimum program-erase count among the closed blocks.

15. The operating method of claim 9, wherein the index of the scan start block is changed according to the latest erase times of the respective closed blocks.

16. The operating method of claim 15, wherein the index of the scan start block is changed to the index of the closed block whose latest erase time is earliest, among the closed blocks.

17. A memory system, comprising:
- a nonvolatile memory device including a plurality of memory blocks; and
- a controller configured to perform a garbage collection based on a block scan operation for checking valid page counts regarding closed memory blocks among the plurality of memory blocks,
- wherein the block scan operation starts at a non-sequential different closed memory block according to a predetermined condition when the operation is performed.

18. The memory system according to claim 17, wherein the controller is configured to check a number of free blocks to determine whether to perform the garbage collection.

\* \* \* \* \*